United States Patent
Van Rompaey et al.

(10) Patent No.: US 7,684,297 B2
(45) Date of Patent: Mar. 23, 2010

(54) OPTICAL RECORD CARRIER RECORDING METHOD, OPTICAL RECORD CARRIER AND APPARATUS FOR WRITING INFORMATION

(75) Inventors: Bart Van Rompaey, Eindhoven (NL); Maarten Kuijper, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 386 days.

(21) Appl. No.: 10/571,833

(22) PCT Filed: Sep. 9, 2004

(86) PCT No.: PCT/IB2004/051727

§ 371 (c)(1),
(2), (4) Date: Mar. 15, 2006

(87) PCT Pub. No.: WO2005/029472

PCT Pub. Date: Mar. 31, 2005

(65) Prior Publication Data

US 2007/0072123 A1    Mar. 29, 2007

(30) Foreign Application Priority Data

Sep. 19, 2003  (EP) .................................. 03103470

(51) Int. Cl.
*G11B 7/00* (2006.01)
(52) U.S. Cl. ................. 369/47.51; 369/47.53
(58) Field of Classification Search .............. 369/47.51, 369/47.52, 47.53, 275.3, 116, 47.5, 120, 369/44.26, 53.22
See application file for complete search history.

(56) References Cited

U.S. PATENT DOCUMENTS

| 7,088,667 | B2 * | 8/2006 | Kobayashi | 369/275.3 |
| 7,102,970 | B2 * | 9/2006 | Ueki | 369/47.51 |
| 7,158,457 | B2 * | 1/2007 | Fukumoto | 369/47.53 |
| 7,161,881 | B2 * | 1/2007 | Pereira | 369/47.51 |
| 7,170,835 | B1 * | 1/2007 | Roh et al. | 369/47.53 |
| 7,379,407 | B2 * | 5/2008 | Pereira | 369/59.11 |

FOREIGN PATENT DOCUMENTS

| EP | 1233409 A2 | 8/2002 |
| WO | 03003153 A2 | 1/2003 |

OTHER PUBLICATIONS

Standard ECMA-267:120 MM DVE—Read-Only Disc, p. 1-77, Dec. 1997.

* cited by examiner

*Primary Examiner*—Nabil Z Hindi

(57) ABSTRACT

A method, an optical record carrier and an apparatus for writing information to an optical record carrier include reading a write strategy from the optical record carrier which has at least two write strategies, and forming pits and lands by controlling a radiation source with the read write strategy. The method further includes determining which of the at least two write strategies is the most optimal one by reading an indication present on the optical record carrier. The most optimal write strategy is used to form the pits and the lands. If an apparatus for writing information to an optical record carrier is capable of applying two or more write strategies stored on the optical record carrier, then the apparatus reads the indication and applies the write strategy which is the most optimal one.

17 Claims, 3 Drawing Sheets

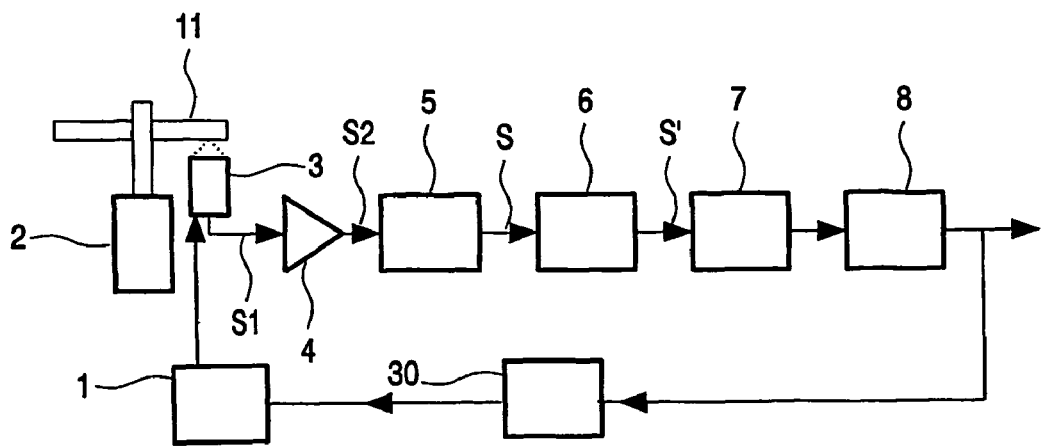
FIG. 1
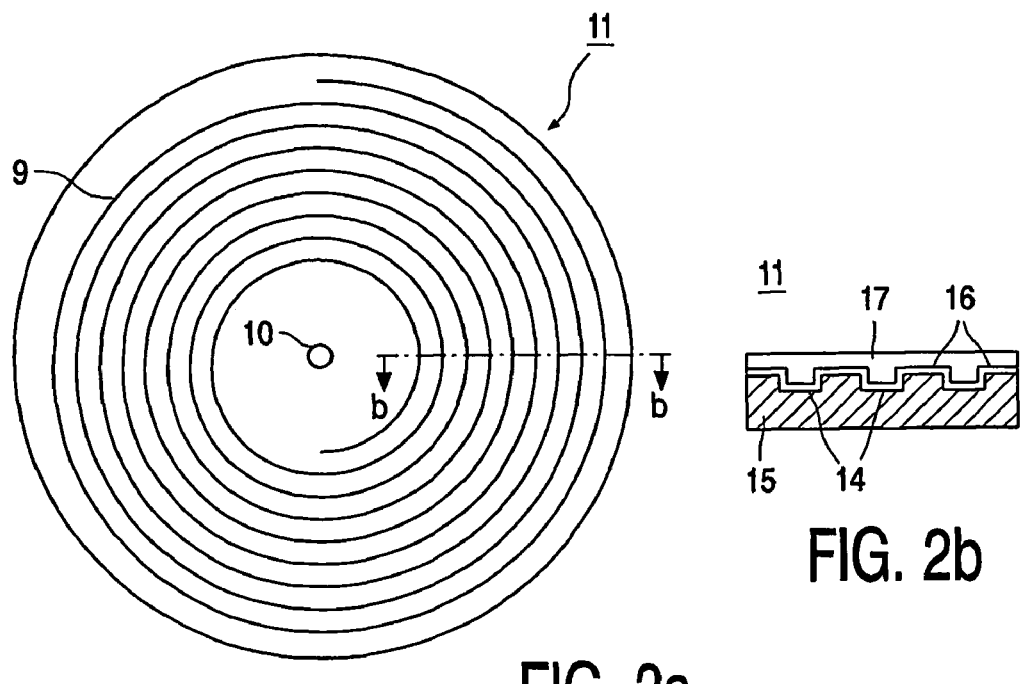
FIG. 2a
FIG. 2b
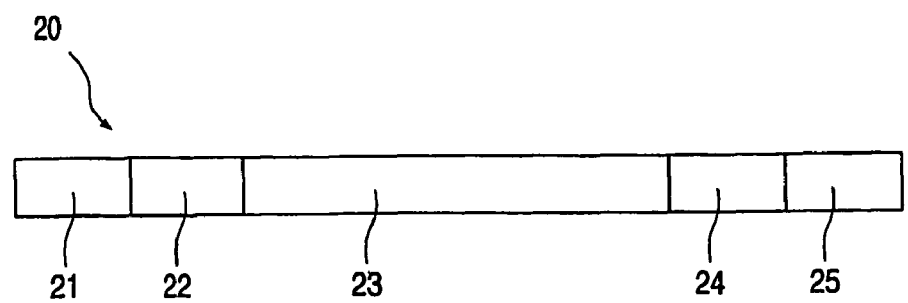
FIG. 3

| Byte number | Content | Number of bytes |
| --- | --- | --- |
| 0 | Disc Category and Version Number: indicates the version of the disc and identifies the definitions of the data in bytes 0 to 63 (important for backwards compatibility). Drives not acquainted with the specific Version Number of a disc should not try to record on that disc using the information in bytes 0 to 63. | 1 |
| 1 | Disc size | 1 |
| 2 | Disc structure | 1 |
| 3 | Recording density | 1 |
| 4 to 15 | Data Zone allocation | 12 |
| 16 | Set to (00) | 1 |
| 17 | Reserved – All (00) | 1 |
| 18 | Extended Information Indicators | 1 |
| 19 to 26 | Disc Manufacturer ID | 8 |
| 27 to 29 | Media type ID | 3 |
| 30 | Product revision number | 1 |
| 31 | number of Physical format information bytes in use in ADIP up to byte 63 (according to first generation: set to 56) | 1 |
| 32 | Reference recording velocity | 1 |
| 33 | Maximum recording velocity | 1 |
| 34 | Wavelength $\lambda_{IND}$ | 1 |
| 35 | normalized Write power dependency on Wavelength $(dP/d\lambda)/(P_{IND}/\lambda_{IND})$ | 1 |
| 36 | Maximum read power at reference velocity | 1 |
| 37 | $P_{IND}$ at reference velocity | 1 |
| 38 | $\beta_{target}$ at reference velocity | 1 |
| 39 | Maximum read power at maximum velocity | 1 |
| 40 | $P_{IND}$ at maximum velocity | 1 |
| 41 | $\beta_{target}$ at maximum velocity | 1 |
| 42 | $T_{top}$ ($\geq 4$) first pulse duration for cm $\geq 4$ at reference velocity | 1 |
| 43 | $T_{top}$ (=3) first pulse duration for cm =3 at reference velocity | 1 |
| 44 | $T_{mp}$ multi pulse duration at reference velocity | 1 |
| 45 | $T_{lp}$ last pulse duration at reference velocity | 1 |
| 46 | $dT_{top}$ ($\geq 4$) first pulse lead time for cm $\geq 4$ at reference velocity | 1 |
| 47 | $dT_{top}$ (=3) first pulse lead time for cm =3 at reference velocity | 1 |
| 48 | $dT_{le}$ 1$^{st}$ pulse leading edge correction for ps =3 at reference velocity | 1 |
| 49 | $T_{top}$ ($\geq 4$) first pulse duration for cm $\geq 4$ at maximum velocity | 1 |
| 50 | $T_{top}$ (=3) first pulse duration for cm =3 at maximum velocity | 1 |
| 51 | $T_{mp}$ multi pulse duration at maximum velocity | 1 |
| 52 | $T_{lp}$ last pulse duration at maximum velocity | 1 |
| 53 | $dT_{top}$ ($\geq 4$) first pulse lead time for cm $\geq 4$ at maximum velocity | 1 |
| 54 | $dT_{top}$ (=3) first pulse lead time for cm =3 at maximum velocity | 1 |
| 55 | $dT_{le}$ 1$^{st}$ pulse leading edge correction for ps =3 at maximum velocity | 1 |
| 56 to 63 | Reserved – All (00) | 8 |
| 64 to 95 | Extended Information block 0 | 32 |
| 96 to 127 | Extended Information block 1 | 32 |
| 128 to 159 | Extended Information block 2 | 32 |
| 160 to 191 | Extended Information block 3 | 32 |
| 192 to 223 | Extended Information block 4 | 32 |
| 224 to 247 | Extended Information block 5 | 24 |
| 248 to 255 | Reserved for use in the Control Data Zone– All (00) | 8 |

FIG.4

OPTICAL RECORD CARRIER RECORDING METHOD, OPTICAL RECORD CARRIER AND APPARATUS FOR WRITING INFORMATION

The invention pertains to an optical record carrier method for forming pits and lands by controlling a radiation source to direct a radiation beam onto a recording surface of an optical record carrier.

The invention further pertains to an optical record carrier.

The invention also pertains to an apparatus for writing information to an optical record carrier.

Optical media store data in digital form, and include all the various CD and DVD and Blu-ray Disc optical disk technologies. The data stored on this media can consist of video, text, audio, computer data, or any other form of digital information. This data is written to and read from an optical disk using a laser.

There are various manufacturers of optical disks. Therefore many different formats and disk types are commercially available. Even within a standardized disc format, such as for example CD-R, CD-R/W, DVD-R, DVD-R/W, BD+R, BD+R/W, each type of optical disk may possess different material parameters. Because of this, each type may behave differently when exposed to a write pulse from a laser. If uncompensated, these differences in behavior result in variations in write performance, such as for example in the jitter and the asymmetry of the written marks. Therefore, for optimum write performance each type of optical disk may require a different write strategy to compensate for its material parameters and other characteristics.

In this application a mark is understood to be any type of optically detectable area on an optical disk. It includes a pit formed by locally heating the area on the optical disk and amorphous areas in a crystalline layer in the optical disk. A write strategy is understood to be any sequence of laser pulses, generated by the laser, causing a mark to be formed on the optical disk when irradiated by the laser pulses.

In one approach an optimal writing strategy is developed for each optical disk by conducting a test writing before attempting to write user information to the disk. The test writing is, in general, made on an inner portion of a lead-in area of the optical disk while incrementally adjusting the write power. Next, the recorded information is read from the test area. The write power at which the desired quality (for example a lowest error rate, an optimum modulation factor, or a lowest jitter factor) and asymmetry of the test writing is obtained is selected as the optimum write power, which is thereafter used for actual recording of user information. However, this approach is disadvantageous in that the results of the test writing are not retained by the disk drive. Therefore, the test writing must be repeated, even on optical disks of the same type, which can be burdensome. Furthermore, each parameter of the write strategy must be developed for each disk, thereby requiring a significant analysis of the characteristics of the test writing.

Another approach requires each optical disk type to be "registered" by an optical disk drive when that drive is manufactured. During the development of an optical disk drive, its manufacturer investigates and develops an optimal write strategy for each type of optical disk of which the drive manufacturer is aware. The manufacturer then compiles data representing a list of compatible optical disk types along with the corresponding optimal write strategy for each optical disk type. This data is often stored in the optical disk drive in a control information memory such as for example an EEPROM, and may contain such recording parameters as the optimum write power, the time modulation, the linear velocity, and the recording speed. A drive then can recognize a particular optical disk type by scanning the lead-in portion of the disk. The characteristics of the lead-in portion of each optical disk type varies by disk manufacturer, thus identifying the manufacturer of the disk.

In WO 03/03153 a method and recording device are disclosed which select and learn an optimal write strategy by testing the performance of different known write strategies, selecting the best write strategy for the particular optical disk type, and storing that information for use when the same optical disk type is subsequently encountered. Information about the best write strategy will be stored in the recording device for use when the same optical disk type is subsequently encountered. However, the information about the best write strategy for use with a specific disk is written to the disk itself. When the disk is subsequently encountered, this information is read from the disk and used by the recording device for selecting the best write strategy.

An apparatus for writing information to an optical record carrier is capable of applying certain write strategies. However, if for a certain type of optical record carrier a new write strategy is developed, it is possible that the apparatus is incapable of applying the new write strategy. Therefore, it is common to write more than one write strategy onto the optical record carrier. The apparatus can then select a write strategy which he can apply. However, if at least two write strategies are written onto the optical record carrier, and the apparatus is capable of applying both, the apparatus does not know which one is the most optimal for that optical record carrier. In the case that even more write strategies are stored onto the optical record carrier the choice becomes even bigger and more likely that not the most optimal write strategy is chosen. The most optimal write strategy also depends on the writing speed with which data is written on the optical record carrier.

It is therefore an object of the present invention to provide an optical record carrier recording method which is capable of determining the most optimal write strategy.

It is also an object of the present invention to provide an optical record carrier to be used in such a method.

It is a further object of the present invention to provide an apparatus for writing information to an optical record carrier which is capable of determining the most optimal write strategy.

According to the invention this object is achieved with an optical record carrier method for forming pits and lands by controlling a radiation source to direct a radiation beam onto a recording surface of an optical record carrier, the method comprising the steps of:

reading a write strategy from the optical record carrier which comprises at least two write strategies, and forming the pits and lands by controlling the radiation source with the read write strategy, wherein the method further comprises a step of determining which of the at least two write strategies is the most optimal one by reading an indication present on the optical record carrier, and wherein the method uses the most optimal write strategy to form the pits and the lands.

According to the invention the optical record carrier comprises at least two write strategies, wherein the optical record carrier further comprises an indication which of the at least two write strategies is the most optimal one.

The apparatus for writing information to an optical record carrier comprises:

a write head for generating a radiation beam and directing the beam onto a recording surface of the optical record carrier, reading means for reading information stored on the optical record carrier, a write head controller for controlling the write head with a write strategy, a processor for controlling the apparatus, the processor being capable of carrying out the method according to the invention.

If an apparatus for writing information to an optical record carrier is capable of applying two or more write strategies stored on the optical record carrier, then the apparatus reads the indication and applies the write strategy which is the most optimal one.

If there are write strategies present on the optical record carrier which can not be applied by the apparatus then the apparatus has to determine which of the write strategies it can apply is the most optimal one. Therefore in an embodiment of the present invention the indicator further indicates in which order the write strategies are preferred for the optical record carrier on which the indicator is stored and wherein the method is capable of determining which of the write strategies can be applied by the method and wherein the method determines from the applicable write strategies which is the most optimal one, the method thereby using the order of preference indicated by the indicator. For instance, if there are three write strategies present and the most optimal one can not be applied by the method, then the apparatus picks the write strategy is the second optimal one.

The indication can be in the form of additional information stored on the optical record carrier, such as byte after each write strategy which value indicates how optimal that write strategy is. How optimal the write strategies are can also be indicated by the sequential order in which the write strategies are stored on the optical record carrier. For instance, the write strategies can be stored in a disc information table present in a zone of the optical record carrier called the Control Data Zone. The first write strategy in the disc information table is the most optimal one. The second write strategy in the disc information table is the second most optimal one, and so on.

In a further embodiment of the present invention the method reads an additional byte contained in the write strategies which additional byte describes a write velocity for which the write strategy can be applied and wherein the method reads the additional information by reading an additional bit or byte contained in the write strategies which indicates if the write strategy is the most optimal one for that write velocity. The apparatus performing this method and which is capable of writing at different writing velocities, can select the most optimal write strategy dependent on the writing velocity.

These and other aspects of the apparatus, information carrier and method according to the invention will be apparent from and elucidated by means of the drawings, in which:

FIG. 1 shows an apparatus for writing information according to the invention,

FIG. 2a shows an information carrier (top view),

FIG. 2b shows an information carrier (cross section),

FIG. 3 shows an example of the information zone of an information carrier,

FIG. 4 shows a table of an example of physical format information,

Figure 5:
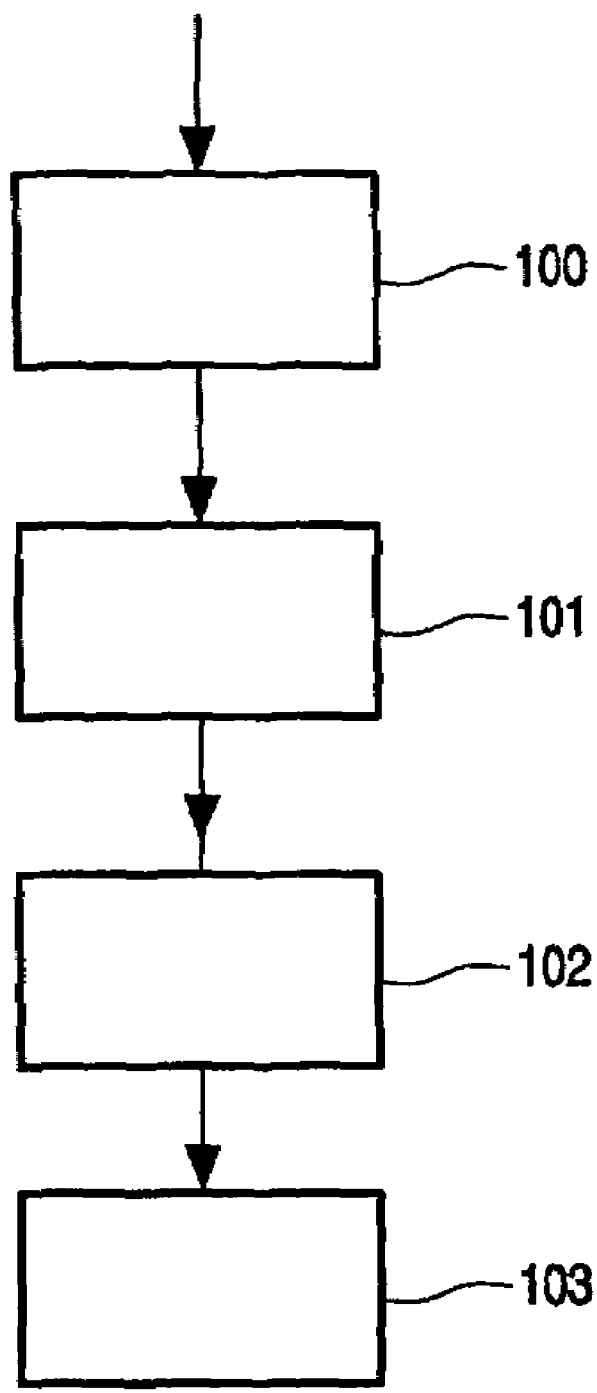
FIG. 5 shows a flow chart of a optical record carrier recording method in accordance with the invention.

The apparatus for writing information shown in FIG. 1 comprises a write head 3 for reading the information from an information carrier 11. A displacement means 2 is able to cause a relative displacement between the information carrier 11 and the write head 3. In operation, an output signal $S_1$ of the read head 3, is fed to an amplifier 4. The amplifier 4 amplifies the output signal $S_1$ to a desired level and supplies an amplified signal $S_2$ to an analog to digital A/D converter 5. The A/D converter 5 converts the amplified signal $S_2$ to a sampled read signal S, using a sampling period of T seconds. The sampled read signal S is fed to the waveform equalizer 6. The waveform equalizer 6 obtains a corrected signal S' by performing a waveform equalization to the read signal S. The output of the waveform equalizer 6 is fed to bit-detection means 7. The output of the bit-detection means 7 is fed to channel decoding means 8. The write head is controlled by the write head controller 1. The processor 30 controls the apparatus. The processor 30 controls the write head 3 to read out the indicator and then determines the most optimal write strategy indicated by the indicator. If the most optimal write strategy can be applied by the apparatus, then the write head controller 1 is provided with the optimal write strategy. Writing information is subsequently performed by using the most optimal write strategy.

FIG. 2a shows a disc-shaped information carrier 11 having a track 9 and a central hole 10. The track 9, being the position of the series of (to be) recorded marks representing information, is arranged in accordance with a spiral pattern of turns constituting substantially parallel tracks on an information layer. The information carrier may be optically readable, called an optical disc, and has an information layer of a recordable type. Examples of a recordable disc are the CD-R and CD-RW, and writable versions of DVD, such as DVD+RW. Further details about the DVD disc can be found in reference: ECMA-267: 120 mm DVD—Read-Only Disc—(1997). The information is represented on the information layer by recording optically detectable marks along the track, e.g. crystalline or amorphous marks in phase change material. The track 9 on the recordable type of information carrier is indicated by a pre-embossed track structure provided during manufacture of the blank information carrier. The track structure is constituted, for example, by a pregroove 14 which enables a read/write head to follow the track during scanning. The track structure comprises position information, e.g. addresses, for indication the location of units of information, usually called information blocks. The position information includes specific synchronizing marks for locating the start of such information blocks. The position information is encoded in frames of modulated wobbles as described below.

FIG. 2b shows a part of a cross-section taken along the line b-b of the information carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

The information carrier 11 is intended for carrying information represented by modulated signals comprising frames. A frame is a predefined amount of data preceded by a synchronizing signal. Usually such frames also comprise error correction codes, e.g. parity words. A number of such frames constitute an information block, the information block comprising further error correction words. The information block is the smallest recordable unit from which information can be reliably retrieved. An example of such a recording system is known from the DVD system, in which the frames carry 172 data words and 10 parity words, and 208 frames constitute an ECC block.

FIG. 3 shows an example of the information zone 20 of an information carrier 11. The information zone 20 contains all the information on the information carrier relevant for data interchange. The Inner Drive Area 21 and Outer Drive Area 25 are meant for disc testing. The Lead-in Zone 22 contains control information. The Lead-out Zone 24 allows for a smooth lead-out and also contains control information. The Data zones 23 are intended for recording of user data. The Lead-in Zone contains a Control Data Zone.

FIG. 4 shows a table of an example of physical format information contained in the Control Data Zone. The Physical format information is encoded in ADIP as described above. This information shall comprise the 256 bytes shown in FIG. 4. It contains disc information and values used for the Optimum Power Control (OPC) algorithm to determine optimum laser power levels for writing. The information is copied into a recordable zone called the Control Data during initialization of the disc. The data contents are for example:

Byte 0—Disc Category and Version Number
Bits b7 to b4 shall specify the Disc Category,
   they shall be set to 1010, indicating a DVD+R disc.
Bits b3 to b0 shall specify the Version Number,
   they shall be set to 0000 indicating the version Byte 1—Disc size and maximum transfer rate
Bits b7 to b4 shall specify the disc size,
   they shall be set to 0000, indicating a 120 mm disc
Bits b3 to b0 shall specify the maximum read transfer rate,
   they shall be set to 1111 indicating no maximum read transfer rate is specified Byte 2—Disc structure
Bit b7 to b4 shall be set to 0000
Bits b3 to b0 shall specify the type of the recording layer(s):
   they shall be set to 0010, indicating a write-once recording layer.

Byte 3—Recording density
Bits b7 to b4 shall specify the average Channel bit length in the Information Zone,
   they shall be set to 0000, indicating 0,133 μm
Bits b3 to b0 shall specify the average track pitch,
   they shall be set to 0000, indicating an average track pitch of 0,74 μm Bytes 4 to 15—Data Zone allocation
Byte 4 shall be set to (00).
Bytes 5 to 7 shall be set to (030000) to specify PSN 196.608 of the first Physical Sector of the Data Zone
Byte 8 shall be set to (00).
Bytes 9 to 11 shall be set to (26053F) to specify PSN 2.491.711 as the last possible Physical Sector of the Data Zone.
Bytes 12 to 15 shall be set to (00)

Byte 16—(00) shall be set to (00).

Byte 17—Reserved. This byte is reserved and shall be set to (00).

Byte 18—Extended information indicators
Bits b7 to b6 are reserved and shall be set to 00
Bits b5 to b0 each of these bits shall indicate the presence of an Extended
   Information block. Bit $b_i$ shall be set to 1 if Extended Information block i, consisting of bytes (64+i×32) to (95+i×32), is in use. Else bit $b_i$ shall be set to 0.

Bytes 19 to 26—Disc Manufacturer ID.
   These 8 bytes shall identify the manufacturer of the disc. Trailing bytes not used shall be set to (00).

Bytes 27 to 29—Media type ID.
   Disc manufacturers can have different types of media, which shall be specified by these 3 bytes. The specific type of disc is denoted in this field.

Byte 30—Product revision number.
   This byte shall identify the product revision number in binary notation. All discs with the same Disc Manufacturer ID and the same Product ID, regardless of Product revision numbers, must have the same recording properties (only minor differences are allowed: Product revision numbers shall be irrelevant for recorders). If not used this byte shall be set to (00)

Byte 31 number of Physical format information bytes in use.
   This byte forms one 8-bit binary number indicating the number of bytes actually in use for Physical format information. It shall be set to (36) indicating that only the first 54 bytes of the Physical format information are used.

Byte 32—Reference recording velocity.
   This byte indicates the lowest possible recording velocity of the disc, which is also referred to as the Reference velocity, as a number n such that $n=10\times v_{ref}$ (n rounded off to an integral value)

It shall be set to (23) indicating a Reference writing speed of 3,49 m/s.

Byte 33—Maximum recording velocity.
   This byte indicates the highest possible recording velocity of the disc, as a number n such that $n=10\times v_{ref}$ (n rounded off to an integral value)

It shall be set to (54) indicating a maximum writing speed of 8,44 m/s.

Byte 34—Wavelength λIND.
   This byte shall specify the wavelength in nanometers of the laser with which the optimum write parameters in the following bytes have been determined, as a number n such that $n=$ Wavelength$-600$ Byte 35 Reserved Byte 36 Maximum read power, Pr at reference velocity.
   This byte shall specify the maximum read power Pr in milliwatts at the reference velocity as a number n such that $n=20\times(\text{Pr}-0,7)$ Byte 37—PIND at reference velocity.
   PIND is the starting value for the determination of Ppo used in the OPC algorithm. This byte shall specify the indicative value PIND of Ppo in milliwatts at the reference velocity as a number n such that $n=20\times(P_{IND}-5)$ Byte 38—$\beta_{target}$ at reference velocity.
   This byte shall specify the target value for β, $\beta_{target}$ at the reference velocity used in the OPC algorithm as a number n such that $n=10\times\beta_{target}$ Byte 39—Maximum read power, Pr at maximum velocity.
   This byte shall specify the maximum read power Pr in milliwatts at the maximum velocity as a number n such that $n=20\times(Pr-0,7)$ Byte 40—$P_{IND}$ at maximum velocity.
   $P_{IND}$ is the starting value for the determination of Ppo used in the OPC algorithm. This byte shall specify the indicative value PIND of Ppo in milliwatts at the maximum velocity as a number n such that $n=20\times(PIND-5)$ Byte 41—$\beta_{target}$ at maximum velocity.
   This byte shall specify the target value for $\beta$, $\beta_{target}$ at the maximum velocity used in the OPC algorithm as a number n such that $n=10\times\beta_{target}$ Byte 42—Ttop ($\geq 4$) first pulse duration for current mark$\geq 4$ at reference velocity.
   This byte shall specify the duration of the first pulse of the multi pulse train when the current mark is a 4T or greater mark for recording at reference velocity. The value is expressed in fractions of the channel bit clock period as a number n such that $n=16\times T_{top}/T_W$ and $4\leq n\leq 40$ Byte 43—Ttop (=3) first pulse duration for current mark=3 at reference velocity.
   This byte shall specify the duration of the first pulse of the multi pulse train when the current mark is a 3T mark for recording at reference velocity. The value is expressed in fractions of the channel bit clock period as a number n such that $n=16\times T_{top}/T_W$ and $4\leq n\leq 40$ Byte 44—Tmp multi pulse duration at reference velocity.
   This byte shall specify the duration of the 2nd pulse through the 2nd to last pulse of the multi pulse train for recording at reference velocity. The value is expressed in fractions of the channel bit clock period as a number n such that $n=16\times T_{mp}/T_W$ and $4\leq n\leq 16$ Byte 45—Tlp last pulse duration at reference velocity.
   This byte shall specify the duration of the last pulse of the multi pulse train for recording at reference velocity. The value is expressed in fractions of the channel bit clock period as a number n such that $n=16\times T_{lp}/T_W$ and $4\leq n\leq 24$ Byte 46—dTtop first pulse lead time at reference velocity.
   This byte shall specify the lead time of the first pulse of the multi pulse train relative to the trailing edge of the second channel bit of the data pulse for recording at reference velocity. The value is expressed in fractions of the channel bit clock period as a number n such that $n=16\times dT_{top}/T_W$ and $0\leq n\leq 24$ Byte 47—dTle 1st pulse leading edge correction for previous space=3 at reference velocity.
   Bit 7 to bit 4 of this byte shall specify the leading edge correction for the 1st pulse of the multi pulse train when the previous space was a 3T space for recording at reference velocity. The value is expressed in fractions of the channel bit clock period according to FIG. 8.

Byte 48—Ttop ($\geq 4$) first pulse duration for current mark$\geq 4$ at maximum velocity.
   This byte shall specify the duration of the first pulse of the multi pulse train when the current mark is a 4T or greater mark for recording at maximum velocity. The value is expressed in fractions of the channel bit clock period as a number n such that $n=16\times T_{top}/T_W$ and $4\leq n\leq 40$ Byte 49—Ttop (3) first pulse duration for current mark=3 at maximum velocity.
   This byte shall specify the duration of the first pulse of the multi pulse train when the current mark is a 3T mark for recording at maximum velocity. The value is expressed in fractions of the channel bit clock period as a number n such that $n=16\times T_{top}/T_W$ and $4\leq n\leq 40$ Byte 50 Tmp multi pulse duration at maximum velocity.
   This byte shall specify the duration of the 2nd pulse through the 2nd to last pulse of the multi pulse train for recording at maximum velocity. The value is expressed in fractions of the channel bit clock period as a number n such that $n=16\times T_{mp}/T_W$ and $4\leq n\leq 16$ Byte 51—Tlp last pulse duration at maximum velocity.
   This byte shall specify the duration of the last pulse of the multi pulse train for recording at maximum velocity. The value is expressed in fractions of the channel bit clock period as a number n such that $n=16\times T_{lp}/T_W$ and $4\leq n\leq 24$ Byte 52—dTtop first pulse lead time at maximum velocity.
   This byte shall specify the lead time of the first pulse of the multi pulse train relative to the trailing edge of the second channel bit of the data pulse for recording at maximum velocity. The value is expressed in fractions of the channel bit clock period as a number n such that $n=16\times dT_{top}/T_W$ and $0\leq n\leq 24$ Byte 53—dTle first pulse leading edge correction for previous space=3 at maximum velocity.
   Bit 7 to bit 4 of this byte shall specify the leading edge correction for the 1st pulse of the multi pulse train when the previous space was a 3T space for recording at maximum velocity. The value is expressed in fractions of the channel bit clock period according to FIG. 8.

Bytes 54 to 63—Reserved—All (00).
   These bytes shall be set to all (00).

Bytes (64+i×32) to (95+i×32)—Extended Information block i (i=0.5)
   To facilitate future extensions, Extended Information blocks are introduced. Each such block consists of 32 bytes. These bytes can hold for instance parameters for an alternative write strategy, e.g. for High-Speed recording, or other advanced parameters. The presence of an Extended Information block shall be indicated by a bit in byte 18.

Byte (64+i×32) Extended Information block i version number indicates the block version and identifies the definitions of the data in bytes (64+i×32) to (95+i×32). A disc can have several Extended Information blocks of which the block version numbers can be the same as well as different.

Drives not acquainted with the specific block version number in block i, should not use the disc with the advanced parameters in this Extended Information block.

If the block version number is set to 255, the related Extended information block is not an independent block but a continuation of the preceding Extended Information block (to be used if 32 bytes are not sufficient for a set of parameters).

Bytes (65+i×32) to (95+i×32)

these bytes can be used to hold alternative write strategies or other parameters.

Example for High-speed Write Strategy Parameters

Byte 18: 0000 0001 indicating Extended Information block 0 is in use.

Byte 64: 0000 0001 indicating block version 1, for which bytes 65 to 95 have the following meaning:

Byte 65: Maximum recording velocity for the parameter set in this EI block:

$n \times 0{,}25$ m/s, (max$\leq 63{,}75$ m/s=$18.25x$=175 Hz @ R=58 mm)

Byte 66: Minimum recording velocity for the parameter set in this EI block: $n \times 0{,}25$ m/s, (minimum recording velocity is allowed to be=maximum recording velocity)

Byte 67: reserved and set to (00)

Byte 68 to 81: parameter set for maximum recording velocity byte 68: PIND byte 69: βtarget byte 70: Ttop ($\geq 4$) first pulse duration for cm$\geq 4$ byte 71: Ttop (=3) first pulse duration for cm=3 byte 72: Tmp multi pulse duration byte 73: Tlp last pulse duration byte 74: dTtop ($\geq 4$) first pulse lead time for cm$\geq 4$ byte 75: dTtop (=3) first pulse lead time for cm=3 byte 76: dTle 1st pulse leading edge correction for ps=3 byte 77: dTle 1st pulse leading edge correction for ps=4 byte 78: reserved and set to (00)

byte 79: reserved and set to (00)

byte 80: reserved and set to (00)

byte 81: reserved and set to (00)

Byte 82 to 95: parameter set for minimum recording velocity byte 82: PIND byte 83: βtarget byte 84: Ttop ($\geq 4$) first pulse duration for cm$\geq 4$ byte 85: Ttop (=3) first pulse duration for cm=3 byte 86: Tmp multi pulse duration byte 87: Tlp last pulse duration byte 88: dTtop ($\geq 4$) first pulse lead time for cm$\geq 4$ byte 89: dTtop (=3) first pulse lead time for cm=3 byte 90: dTle 1st pulse leading edge correction for ps=3 byte 91: dTle 1st pulse leading edge correction for ps=4 byte 92: reserved and set to (00)

byte 93: reserved and set to (00)

byte 94: reserved and set to (00)

byte 95: reserved and set to (00)

The indicator can be implemented by using one or more bytes of the physical format information bytes. The value of these bytes indicates how optimal the write strategy is for the optical record carrier on which the indicator is stored.

For the different write velocities different write strategies are optimal. Also for one write velocity different write strategies can be applicable. A way to indicate for the different write velocity what write strategy is applicable is to use a byte [7. .0] for each write velocity:

Bits 7.4 describe the velocity (16 possible velocities)
e.g. 0001 decodes for 1X (reference velocity)
0111 decodes for 7X Bits 3.0 describe which write strategy (out of four in this case) applies
e.g. 0101: WS1 and WS3 are applicable
1000: WS4 is applicable To describe which velocity is optimal at each velocity a byte per velocity is added:

Bits 7.4 describe the velocity
e.g. 0001 decodes for 1X (reference velocity)
1000 decodes for 7X Bits 3.0 describe which velocity applies
e.g. 0100: WS3 is optimal
1000: WS4 is optimal In step 1 (100) of FIG. 5 the write strategies contained in the optical record carrier which can be applied by the method are determined. In step 2 (101) the indicators of the applicable write strategies are read. Subsequently, in step 3 (102), the most optimal write strategy is determined. For instance, the write strategy with the highest indicator is the most optimal one. Of course, the write velocity is also taken into account, i.e. only the write strategies which are applicable for the write velocity at which the information should be written are taken into account. Finally, in step 4 (103), the pits and lands are formed by controlling the radiation source with the determined optimal write strategy.

The invention claimed is:

1. An optical record carrier recording method by an apparatus for forming pits and lands by controlling a radiation source to direct a radiation beam onto a recording surface of an optical record carrier, the method comprising the acts of:

reading a write strategy from the optical record carrier which comprises write strategies, forming the pits and lands by controlling the radiation source with the read write strategy, determining which of the write strategies can be applied by the apparatus;

determining which of the write strategies is a most optimal write strategy by reading an indication present on the optical record carrier, using the most optimal write strategy to form the pits and the lands, and concluding from a sequential order in which the write strategies are stored on the optical record carrier which write strategy is the most optimal write strategy.

2. The method of claim 1, wherein the indicator further indicates in which order the write strategies are preferred for the optical record carrier on which the indicator is stored, the method thereby using the order indicated by the indicator.

3. The method of claim 1, wherein the method determines the most optimal write strategy by reading additional information stored the optical record carrier.

4. The method of claim 3, wherein the method reads the additional information from a Control Data Zone present in a lead-in zone of the optical record carrier.

5. An optical record carrier recording method by an apparatus for forming pits and lands by controlling a radiation source to direct a radiation beam onto a recording surface of an optical record carrier, the method comprising the acts of:

reading a write strategy from the optical record carrier which comprises write strategies, forming the pits and lands b controlling the radiation source with the read write strategy, determining which of the write strategies can be applied by the apparatus;

determining which of the applicable write strategies is a most optimal write strategy by reading an indication present on the optical record carrier, and using the most optimal write strategy to form the pits and the lands, wherein the method reads an additional byte contained in the write strategies, wherein the additional byte describes a write velocity for which the write strategy can be applied and wherein the method reads additional information by reading an additional bit or byte contained in the write strategies which indicates if the write strategy is the most optimal write strategy for that write velocity, wherein a sequential order in which the write strategies are stored on the optical record carrier indicates which write strategy is the most optimal write strategy.

6. An optical record carrier comprising:

write strategies, and an indication which of the write strategies is a most optimal write strategy for an apparatus, based on capabilities of the apparatus to use the write strategies, wherein a sequential order in which the write strategies are stored on the optical record carrier indicates which write strategy is the most optimal write strategy.

7. The optical record carrier as claimed in claim 6, the indicator further indicates in which order the write strategies are preferred for the optical record carrier on which the indicator is stored.

8. The optical record carrier as claimed in claim 6, wherein additional information stored on the optical record carrier indicates which write strategy is the most optimal write strategy.

9. The optical record carrier as claimed in claim 8, wherein the additional information is stored in a Control Data Zone present in a lead-in zone of the optical record carrier.

10. An optical record carrier comprising:

write strategies, and an indication which of the write strategies is a most optimal write strategy for an apparatus, based on capabilities of the apparatus to use the write strategies, wherein the write strategies contain an additional byte describing a write velocity for which the write strategy can be applied and an additional bit or byte indicating if the write strategy is the most optimal write strategy for that write velocity, wherein a sequential order in which the write strategies are stored on the optical record carrier indicates which write strategy is the most optimal write strategy.

11. An optical record carrier comprising:

write strategies, an indication which of the write strategies is a most optimal write strategy for an apparatus, based on capabilities of the apparatus to use the write strategies, and at least two additional bytes, wherein each byte indicates for a write velocity which of the write strategies may be applied for that write velocity and wherein the optical record carrier further comprises at least two further additional bytes each byte indicating for a write velocity which of the write strategies is the most optimal write strategy, wherein a secquential order in which the write strategies are stored on the optical record carrier indicates which write strategy is the most optimal write strategy.

12. An apparatus for writing information to an optical record carrier, comprising:

a write head for generating a radiation beam and directing the beam onto a recording surface of the optical record carrier, reading means for reading information stored on the optical record carrier, a write head controller for controlling the write head with a write strategy, a processor for controlling the apparatus, the processor being capable of carrying out the acts of:

reading a write strategy from the optical record carrier which comprises write strategies, forming the pits and lands by controlling the radiation source with the read write strategy, determining which of the write strategies can be applied by the apparatus;

determining which of the applicable write strategies is a most optimal write strategy by reading an indication present on the optical record carrier, using the most optimal write strategy to form the pits and the lands, and concluding from a sequential order in which the write strategies are stored on the optical record carrier which write strategy is the most optimal write strategy.

13. The apparatus of claim 12, wherein the indicator further indicates in which order the write strategies are preferred for the optical record carrier on which the indicator is stored, the method thereby using the order indicated by the indicator.

14. The method of claim, further comprising the act of, prior to the reading act, determining that the apparatus is capable of applying two or more write strategies stored on the optical record carrier and performing the reading act if the apparatus is capable of applying the two or more write strategies.

15. The method of claim 5, further comprising the act of, prior to the reading act, determining that the apparatus is capable of applying two or more write strategies stored on the optical record carrier and performing the reading act if the apparatus is capable of applying the two or more write strategies.

16. The method of claim 1, wherein the sequential order indicates in which order the write strategies are preferred for the optical record carrier on which the indicator is stored, and if a first write strategy of the sequential order cannot be applied by the apparatus, then picking a second write strategy of the sequential order, the second write strategy following the first write strategy in the sequential order.

17. The method of claim 5, wherein the sequential order indicates in which order the write strategies are preferred for the optical record carrier on which the indicator is stored, and if a first write strategy of the sequential order cannot be applied by the apparatus, then picking a second write strategy of the sequential order, the second write strategy following the first write strategy in the sequential order.

* * * * *